United States Patent [19]

Tung

[11] Patent Number: 4,924,160
[45] Date of Patent: May 8, 1990

[54] STAGGERED SEEKING METHOD FOR DISK DRIVE SECTOR SERVO

[75] Inventor: Joseph S-T Tung, Saratoga, Calif.

[73] Assignee: Alps Electric Co., Ltd., Tokyo, Japan

[21] Appl. No.: 295,093

[22] Filed: Jan. 9, 1989

[51] Int. Cl.$^5$ ............................................. G05B 13/00
[52] U.S. Cl. ..................................... 318/561; 318/571;
 360/77.06; 360/77.05; 360/78.07; 187/116
[58] Field of Search .............................. 318/561, 571;
 360/77.06, 77.05, 78.07; 187/116

[56] References Cited

U.S. PATENT DOCUMENTS

| | | | |
|---|---|---|---|
| 4,124,101 | 11/1978 | Satoh | 187/116 |
| 4,297,734 | 10/1981 | Laishley et al. | 318/571 X |
| 4,642,709 | 2/1987 | Vinal | 360/77.05 |
| 4,701,815 | 10/1987 | Yada et al. | 360/77.06 |
| 4,775,903 | 10/1988 | Knowles | 360/78.07 |

Primary Examiner—William M. Shoup, Jr.
Assistant Examiner—Saul M. Bergmann
Attorney, Agent, or Firm—Guy W. Shoup; Norman R. Klivans

[57] ABSTRACT

A sampled data read/write head positioning system for a disk drive having a sector servo overcomes the low bandwidth constraints of feedback position samplers. The system includes controlled acceleration and controlled deceleration of the read/write heads while seeking a track. In order to avoid missing track addresses, the sectors on each disk surface are staggered (offset) along each track from the corresponding sectors on the other disk surfaces, and each read/write head is used to find a particular track by sequentially switching the read/write heads while seeking.

18 Claims, 5 Drawing Sheets

STAGGERED SEEKING METHOD FOR DISK DRIVE SECTOR SERVO

BACKGROUND OF THE INVENTION

1. Field of the Invention

The present invention relates to sampled positioning systems for moving a member between positions, such as is used in a magnetic hard disk drive sector servo system.

2. Description of the Prior Art

A typical positioning system using sampled position signals to which the present invention relates involves the positioning of a data recording head (a position sampling means) over a selected track of a magnetic hard disk drive. Typical contemporary hard disk drive systems provide positioning by two independent modes of operation, i.e., a seek mode and a track-follow mode, both under control of a microprocessor in the disk drive. The seek mode is for moving the head across many tracks to a target track. The track follow mode is typically used to keep the head on one track. A typical disk drive system which uses sampled data systems performs well in the track-follow mode. However, with the same constraints in the seek mode the result is a longer than desired seek time, because low positioning bandwidth is a constraint. The seek mode is necessarily of wider bandwidth due to stability and error constraints of the system. Conversely, the track-follow mode is of narrow bandwidth since the primary objective is to lock the system onto the target track and thereafter minimize run-out due to positioning error, windage, or low frequency disturbances.

The different requirements of the seek mode and track-follow mode mandate two independent positioning modes. One way to achieve this is the use of a separate servo band. Hence the servo data is separate from the recorded data, so the servo and data tracks in a well designed disk drive do track each other, up to a point. This permits disk drive track density as high as 2000 TPI (tracks per inch), with typical disk drive track density around 1300 TPI. Any higher track density causes problems in the mechanical system, i.e. tracking of the recorded data track to the servo track.

It is technically desirable to provide servo position data contiguous with the recorded data. This contiguousness can be accomplished by interspersing servo data with recorded data and thereby invoking a sampled-data approach to position the recording apparatus. Since position data is only available at servo data sampling times, such sampling data systems are necessarily of low bandwidth.

One method to avoid increased bandwidth is to use feed-forward, and provide both a coarse control and a feedback control system to provide a fine control for deviations between the actual and nominal positions. The feedback control system can be low bandwidth, such as in a sampled data system. The feedforward control system provides the approximate input to the actuator (typically a voice coil motor) required to move between positions in time-optimal fashion. The feedforward control system uses an idealized model and precalculates the trajectory, and the model uses all the parameters involved in the systems equations. The feedforward control system therefore puts a constraint on the designer of disk drives. That is, the designer must take into account the characteristics of every part involved, such as the actuator, especially the $K_T$ versus position and $K_T$ versus electric current. $K_T$ is force per unit current; in meter, kilograms, and seconds, units $K_T$ is Newton/ampere; and in English units it is oz./ampere. For torque, $K_T$ is Newton meters/ampere; and in English units $K_T$ is oz. in./ampere. All servo positioning systems depend on the linearity of $K_T$.

SUMMARY OF THE INVENTION

A servo system in accordance with the present invention has two main elements: controlled acceleration/deceleration and staggered seek. The staggered seek is necessary to get the benefit of the controlled acceleration/deceleration. This controlled acceleration is different from the open loop acceleration that is used in the well known prior art. In the prior art, velocity is served so as to first accelerate as hard as possible given the power supply available, resistance of the voice coil motor and other factors, until the velocity crosses over the scheduled velocity curve. Then the voice coil motor goes into either a coast mode or into a decelerate mode. Coast mode is usually used when long seeks are encountered. When in coast mode the velocity is constant, i.e. the current in the voice coil motor is approximately zero. When in deceleration mode the voice coil motor tries to follow the scheduled velocity curve down to the target track.

Figure 1A:
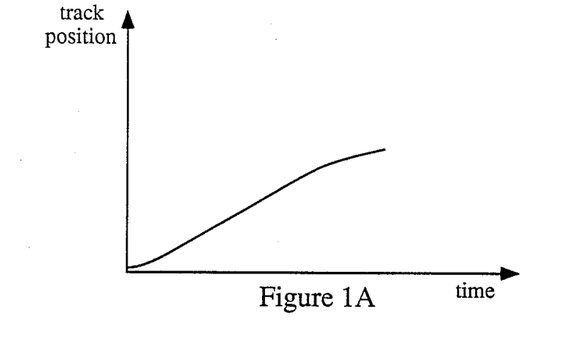
FIGS. 1a–1c illustrate nominal head position, velocity, and motor current versus time in accordance with the present invention.
Figure 1B:
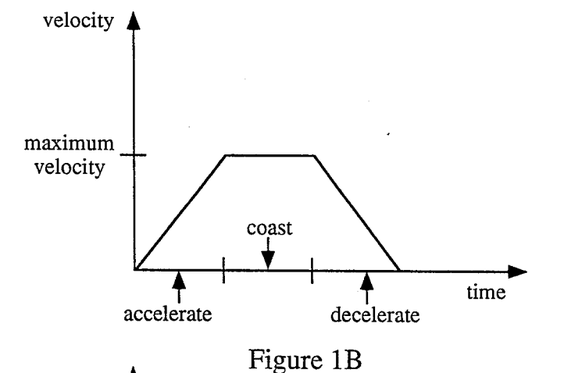
Figure 1C:
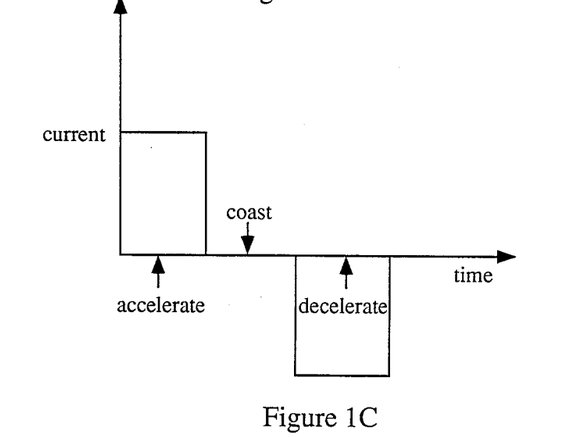

The head movement in accordance with the present invention differs from the prior art and is illustrated in FIGS. 1A, 1B, and 1C. FIG. 1A illustrates a nominal head position in terms of track position (vertical scale) versus time (horizontal scale) for the present invention showing the result of controlled acceleration and deceleration in accordance with the present invention. FIG. 1B shows the corresponding head velocity versus time, showing acceleration mode, coast mode, and deceleration mode. FIG. 1C shows the corresponding current provided to the voice coil motor actuator which moves the head versus time.

Controlled acceleration/deceleration as used in accordance with this invention thus allows the read/write headstack to cross a maximum number of tracks in a given time span while seeking a track, so as to minimize seek time. In the typical disk drive, the read/write heads are arranged on arms in a "stack" so all the heads move radially on the disk surfaces together, with one head per disk surface. A critical acceleration rate is calculated based on track density. This critical acceleration value is then the acceleration of the actuator in moving the headstack (which is a member) while seeking.

Since the read/write heads cross the tracks so fast under controlled acceleration/deceleration, the probability that a particular read/write head will cross a track between sectors is increased undesirably over the prior art. Thus there is a high probability of missing a track address.

It is possible for such a read/write head with controlled acceleration to cross as many as 30 tracks and miss reading addresses on each track. If the track addresses are encoded in Gray code (as is well known in the art), there is always an uncertainty of plus or minus one track; if the read/write head just misses reading a track address then the uncertainty as to location of the head is an additional ± one track. The point is, controlled acceleration is not feasible without a better method to determine track location.

It is thus necessary to reduce the probability of missing the track address. The method to do so includes a staggered seek.

Since there is no write operation taking place during seek mode in the typical disk drive, all the read/write heads are available during seek mode to perform a read operation. The staggered seek thus uses all of the read/write heads in the headstack for seeking. Track follow mode is used to correct for seek errors when the servo is in seek mode. For instance, if the seek mode causes the head to overshoot the target track, track follow mode is used to move the head a few tracks back to the target track.

Staggering is implemented by providing that the sectors (containing the track address) on each disk surface are physically offset along the track from the sectors of the corresponding track on the other disk surfaces. In the prior art disk drives, the sectors on each surface are vertically aligned with the corresponding sectors on the other disk surfaces. Thus, for instance, if the head on the first surface is over the track address field of track 103, sector 37, the head on the second surface and on the third surface and on the fourth surface, etc. are also over the track address field of track 103, sector 37 on their respective surfaces.

In contrast, the offsets of the sectors on each disk surface of the present invention provide that if the first head is over the track address field of track 103, sector 37, the other heads will not be over the track address field of the corresponding sector, but will be over a slightly different part of track 103, either slightly ahead or slightly behind the track address field of sector 37.

Each read/write head is sequentially switched ("scanned") so each head reads sequentially during a seek. Thus the effective sampling rate to determine track position is increased over the prior art by a factor corresponding to the number of disk surfaces in a conventional disk drive having one head per surface. For instance, two surfaces doubles the effective sampling rate; four surfaces quadruples the effective sampling rate.

In a non-conventional disk drive, for instance, one having two heads per surface with the heads arranged non-radially to each other, the staggered seek could be implemented without any staggering of the sectors, merely by scanning the heads while seeking.

The amount of stagger (displacement) of the sectors is a function of the sample period divided by the number of surfaces.

The staggered seek is not used during short seeks, of seven tracks or less, or for the last seven tracks of longer seeks, for reasons described below.

To summarize, in accordance with the invention, a disk drive servo system includes a headstack which is a member moved by an actuator under control of a microprocessor and timing means having a controlled acceleration and deceleration rate. The heads on the headstack are position sampling means, which sequentially read the track addresses of the sectors under the heads, thus indicating the track position of each head. Each head is over each sector for a particular duration of time, called a sampling time, which is a function of the number of sectors and rotational speed of the disk.

The sectors on each disk surface in the disk drive are therefore staggered along the tracks so as to increase the chance while the headstack is seeking that one of the heads can read a track address; thus the heads are sequentially scanned during seeking so as to read all the heads and take advantage of the staggering.

Thus novel elements of the present invention include:
1. Use of the above mentioned feed forward method for seeking, since both the direction (radially in or out) and the distance (number of tracks) that the read/write heads must seek are known. The feed forward method is accomplished by a pre-calculated trajectory based on a certain critical acceleration value.
2. Use of head scanning to read staggered track addresses at least on longer seeks.
3. Use of different methods of seeking for long and short seeks.

BRIEF DESCRIPTION OF THE DRAWINGS

Identical reference numbers in various figures denote similar or identical structures.

DETAILED DESCRIPTION OF THE INVENTION

First, in accordance with the present invention the servo system of the disk drive uses controlled radial acceleration and deceleration while seeking a track. The reason for doing this is to maximize the speed of radial headstack movement.

In accordance with the present invention, controlled acceleration is used and the acceleration used is precalculated. The acceleration that is used is that amount of acceleration calculated to cross one track from a standing start in two sample times.

Figure 2:
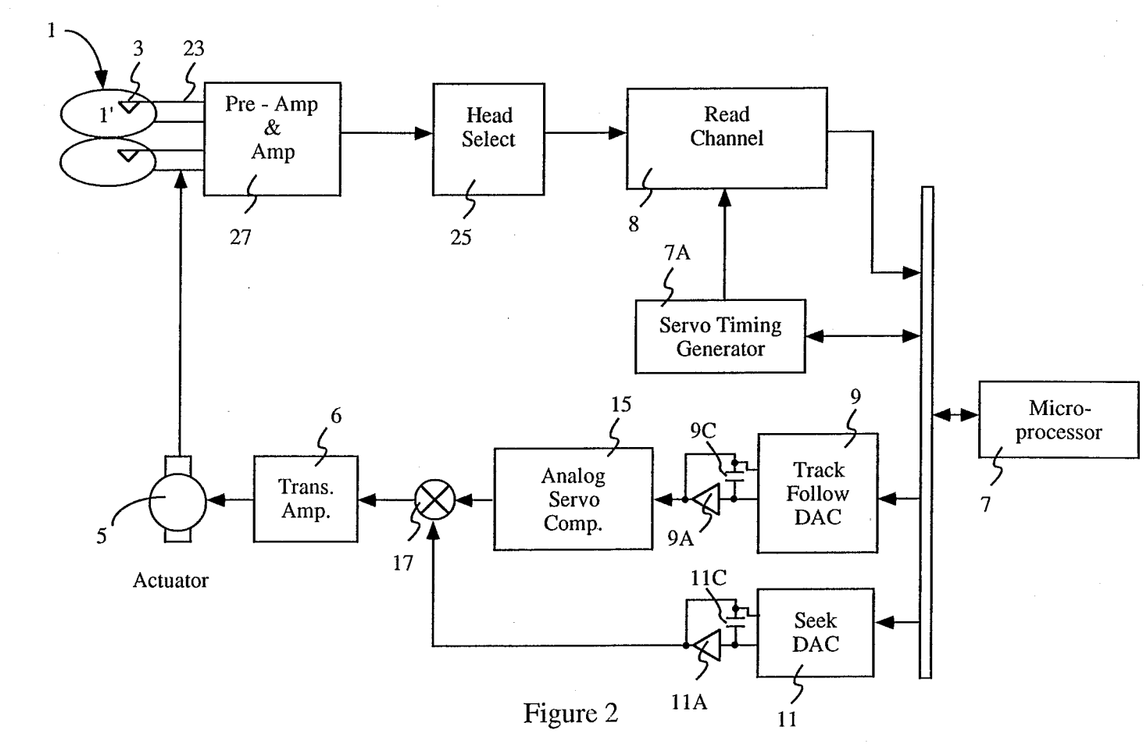
FIG. 2 illustrates a partial block diagram of a disk drive showing the seeking elements, in accordance with the present invention.

In one embodiment of the present invention (see FIG. 2), the disk 1 rotates at for example 3205 R.P.M., and is divided into 72 sectors. Thus each sector is under a particular read/write head 3 for a sample time t of 260 $\mu$sec. (Calculated as: (1 minute/3205 revolutions)×(60 seconds/1 minute)×(1 revolution/72 sectors)=260×10$^{-6}$ sec). If the track density is for example 1302 TPI (tracks per inch), then each track has a width s of 768$\mu$ inch (19.5$\mu$ meter).

Since the track addresses are encoded in Gray code as is known in the art and each track has a unique address, the address can be checked half as often as the duration of the sample time. Thus the sample period is 2×260 $\mu$sec=520 $\mu$sec. For calculating the critical acceleration value, the sample period (520 $\mu$sec) is used to keep the critical acceleration value within reasonable limits.

Then using $s=\frac{1}{2}at^2$, where a is the critical acceleration value, $$a = \frac{2s}{t^2}, \text{ so } a = \frac{2 \times 768 \text{ inch} \times 10^{-6}}{(520 \times 10^{-6} \text{ sec})^2} = 5680.47 \text{ in/sec}^2.$$

This acceleration value can be transformed into rotational coordinates if a rotary voice coil motor 5 is used for the actuator to move the headstack radially So using this critical acceleration value for acceleration, the track number reached at various multiples of the sample period will be known, as shown in Table 1.

TABLE 1

| ΔTracks (additional tracks crossed) | Time, seconds | Distance, inches | Velocity inches/ second | Number of Tracks Crossed |
|---|---|---|---|---|
| 0 | Then @ t = 0 | Then S = 0 | 0 | 0 |
| Δ1 | Then @ t = 520 × 10$^{-6}$; | S = 768 × 10$^{-6}$ | 2.953846154 | 1 |
| Δ3 | @t = (520 × 10$^{-6}$) × 2; | 4 × 768 × 10$^{-6}$ | 5.907692308 | 4 |
| Δ5 | @t = (520 × 10$^{-6}$) × 3; | 9 × 768 × 10$^{-6}$ | 8.8615385 | 9 |
| Δ7 | @t = (520 × 10$^{-6}$) × 4; | 16 × 768 × 10$^{-6}$ | 11.815385 | 16 |
| Δ9 | @t = (520 × 10$^{-6}$) × 5; | 25 × 768 × 10$^{-6}$ | 14.7692 | 25 |
| Δ11 | @t = (520 × 10$^{-6}$) × 6; | 36 × 768 × 10$^{-6}$ | 17.72308 | 36 |
| Δ13 | @t = (520 × 10$^{-6}$) × 7; | S = 49 × 768 × 10$^{-6}$ | 20.67692 | 49 |
| Δ15 | @t = (520 × 10$^{-6}$) × 8; | S = 64 × 768 × 10$^{-6}$ | 23.63077 | 64 |
| Δ17 | @t = (520 × 10$^{-6}$) × 9; | S = 81 × 768 × 10$^{-6}$ | 26.5846 | 81 |
| Δ19 | @t = (520 × 10$^{-6}$) × 10; | S = 100 × 768 × 10$^{-6}$ | 29.538 | 100 |
| Δ21 | @t = (520 × 10$^{-6}$) × 11; | S = 121 × 768 × 10$^{-6}$ | 32.49 | 121 |
| Δ23 | @t = (520 × 10$^{-6}$) × 12; | S = 144 × 768 × 10$^{-6}$ | 35.446 | 144 |
| Δ25 | @t = (520 × 10$^{-6}$) × 13; | S = 169 × 768 × 10$^{-6}$ | 38.4 | 169 |
| Δ27 | @t = (520 × 10$^{-6}$) × 14; | S = 196 × 768 × 10$^{-6}$ | 41.354 | 196 |
| Δ29 | @t = (520 × 10$^{-6}$) × 15; | S = 225 × 768 × 10$^{-6}$ | 44.308 | 225 |
| Δ31 | @t = (520 × 10$^{-6}$) × 16; | S = 256 × 768 × 10$^{-6}$ | 47.261 | 256 |

If such a controlled acceleration mode is started for example with the headstack 23 on track 0 (see Table 1), the microprocessor 7 in conjunction with the servo timing generator 7A which controls the disk drive will read the track address via read channel 8 to see if the headstack 23 is indeed on track 1 after 520 μsec (one sample period) have elapsed, and after another 520 μsec the microprocessor 7 will read the track address again (i.e., the track location of the headstack) to see if the track address is track 4. Read channel 8 is conventional and is well known in the art. Another 520 μsec later the microprocessor 7 will again read to see if the track address is track 9. The Gray code track address is converted to binary form so the microprocessor 7 can read the track address.

Furthermore, since there are two channels equipped with DAC (Digital to Analog Conversion) in the servo system to control actuator 5 (voice coil motor), one channel including track follow DAC 9 is used for track-follow mode and one channel including seek DAC 11 is used for seek mode. Each of the two DAC channels also includes respectively an operational amplifier 9A, 11A, and a capacitor 9C, 11C. Track-follow mode is also used to correct for windage bias, flex cable bias, and other offsets known in the art and also used during seek mode to correct the trajectory of the headstack. During seek mode, if a read/write head 3 is supposed to read a certain track address, and the read/write head 3 moved too far, a correction voltage is conventionally generated and applied to channel 9 and that reduces the read/write head 3 movement, so the next track address the read/write head 3 will read is read nearly perfectly.

Figure 3A:
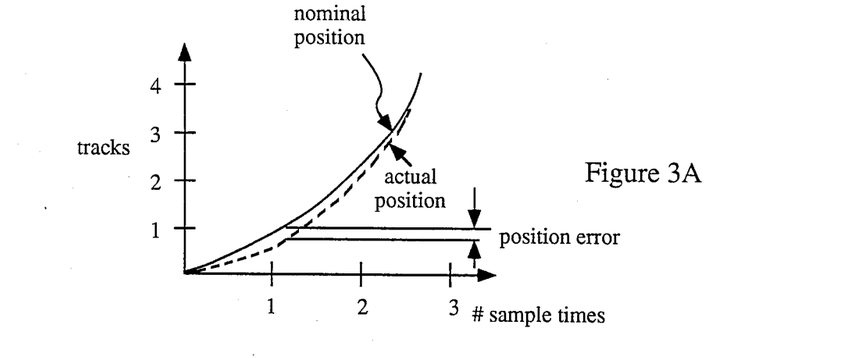
FIGS. 3a–3c illustrate nominal versus actual head position, velocity, and motor current in accordance with the present invention.
Figure 3B:
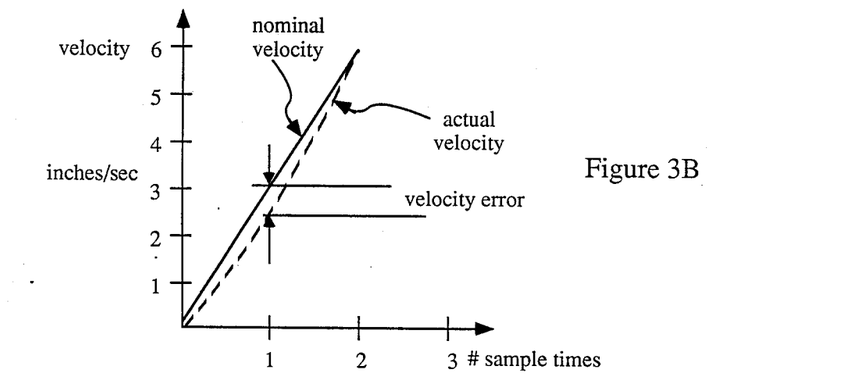
Figure 3C:
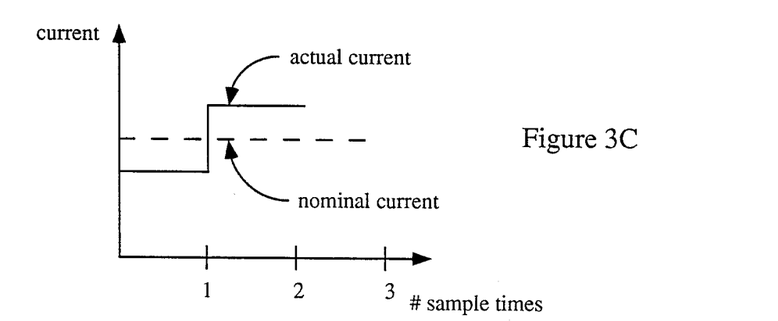

The need for correction is illustrated in FIGS. 3A, 3B and 3C. FIG. 3A shows the problem of position error whereby actual headstack position expressed in track location (vertical axis) is slightly off nominal headstack position versus time expressed in terms of number of sample times (horizontal axis). This position error is the result of the factors discussed above such as windage bias, flex 16 cable bias, and other known offsets. FIG. 3B shows correspondingly how actual headstack velocity departs from nominal headstack velocity versus time, which departure is called velocity error. FIG. 3C shows correspondingly how actual voice coil motor actuator current departs from nominal current versus time.

The track follow DAC 9 (see FIG. 2) is thus active at all times when the disk drive is powered on; only the seek DAC 11 is turned on when positioning of the head stack 23 is necessary, and turned off when such positioning is completed.

The reason for the analog servo compensator 15 (i.e., an analog leadlag) is that in seek mode, the corrections in the seek channel including seek DAC 11 for the windage, flex cable bias, and other offsets will be "on" to create a smoother transition from seek mode to track-follow mode and also from track-follow mode to seek mode, and to avoid problems caused by the limited output range (typically 0 to 5 volts) of the microprocessor. Multiplexer 17 performs the mode transition by switching the seek mode DAC 11 off.

Thus the seek mode is described above. As regards the track-follow mode, in the above described embodiment the disk 1 is spinning at 53.42 revolutions per second (equivalent to 3205 R.P.M.). At 72 sectors per revolution, the sample rate is 3846 samples/second. [Calculated as: (53.42 revolutions/second)×(72 sectors/revolution)=3846 samples/second. This is, of course, the reciprocal of the 260 μsec sample time.] Thus the theoretically usable frequency (the Nyquist frequency) is one half this rate, or 1923 samples per second, which is 1923 Hz corresponding to the 520 μsec sample period. The well known Nyquist theorem states that it takes two samples at a minimum to reconstruct a waveform; one sample for amplitude and one sample for phase. Also due to sampling, there is an associated phase loss. Thus, more realistically, the sample rate would be 1000 Hz. It would be advantageous to increase the sample rate so that in the seek mode, the microprocessor 7 can more frequently check the location of the read/write head 3. One way to increase the seek rate is to stagger the sample locations (i.e., the locations of track addresses) on both sides of the disk 1. During seek mode each read/write head 3 in the headstack 23 can be selected by the head select circuit 25. In one embodiment, the invention uses a commercially available read/write preamplifier and write amplifier 27 made by SSI (Silicon Systems Inc.), which component (part No. SSI511R) can select a particular head 3 and disk surface 1' for reading and also select a particular head and surface for writing. The SSI component 27 is capable of supporting four read/write heads. Other circuitry would support a greater number of heads.

Figure 4:
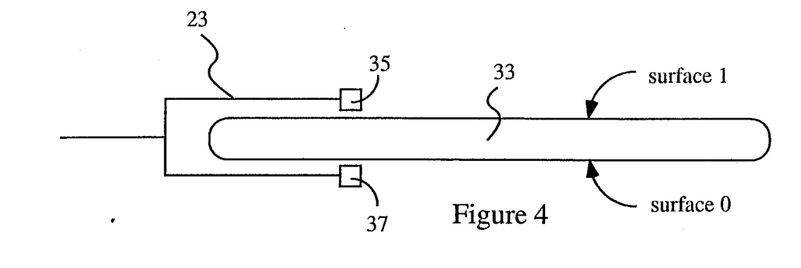
FIG. 4 illustrates a disk surface and heads in accordance with the present invention.

FIG. 4 shows a disk 33 with read/write head 35 on the top surface 1 and read/write head 37 on the bottom surface 0 and also headstack carriage 23.

Figure 5:
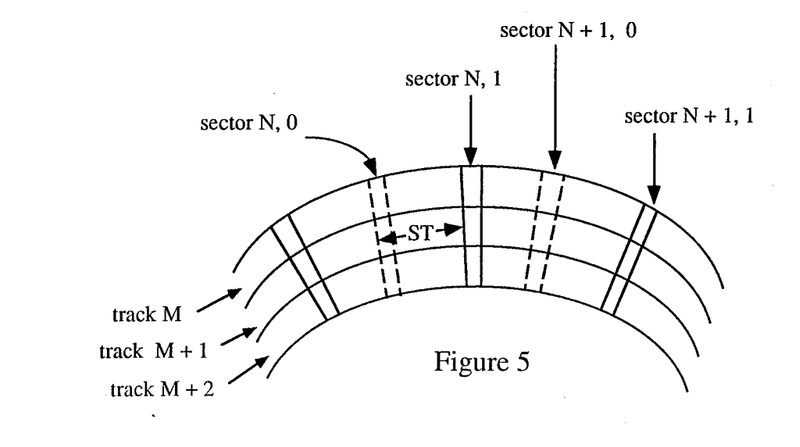
FIG. 5 illustrates tracks and sectors on a disk, in accordance with the present invention.

FIG. 5 shows several tracks M, M+1, M+2 with sectors including sector N,0, sector N,1, sector N+1,0 and sector N+1,1 showing both sides of the disk. In each case the sector on surface 0 is shown with dotted lines (as being on the underside of the disk) and the sector on surface 1 shown with solid lines.

Figure 6:
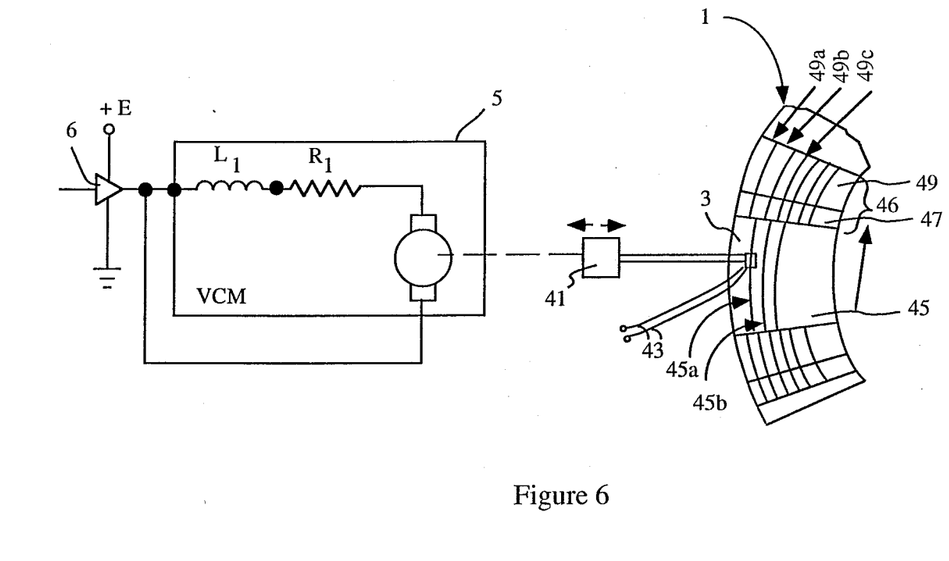
FIG. 6 illustrates the positioning system of a disk drive, in accordance with the present invention.

FIG. 6 shows the components of the positioning system of the invention including the voice coil motor 5 moving a headstack carriage 41 which in turn moves the read/write head 3 whose signal can be read back on wires 43, the read/write head 3 flying above the recording disk 1, which has data tracks 45, and also servo section 46 including both track address 47 and analog position reference servo tracks 49. Only one disk 1 and one head 3 are shown in FIG. 6; there are at least two of each in the system. Also shown are the transconductance amplifier 6, or alternatively a power amplifier (as in FIG. 1), that provide power to voice coil motor 5; resistor $R_1$ and inductance $L_1$ are part of the voice coil motor 5.

If the read/write head 3 accelerates from a track X, and the target track is track X+n, different heads in the headstack can be selected while seeking. First, using controlled acceleration, the head 3 will have moved exactly one track after a time of t=520 μsec (one sample period). The current for the voice coil motor 5 is provided by a transconductance amplifier 6 (or alternatively a power amplifier). The transconductance amplifier 6 (or power amplifier) is bipolar in terms of current flow. An acceleration boost value is used to slew the current up as fast as allowed by the transconductance amplifier 6 so as to provide controlled acceleration.

The acceleration boost value can conventionally be determined experimentally or adaptively (that is, under computer program control). Then the microprocessor (not shown) checks the track address 47 to see where the read/write head 3 is at that time (i.e., after 520 μsec). A decelerate boost value, for the same reason, is also used for controlled deceleration, such that the read/write head 3 can be at a track address 47 at a known time.

Since the reading of the track address 47 can be as much as half a track off before reading the next track address, it is advantageous to read as many track addresses as possible within a specified time, so the sequential head scan technique is used. As is conventional, the data tracks 45a, 45b are typically centered on the boundaries between the servo tracks 49a, 49b, 49c.

The read/write heads in the headstack 23 (see FIG. 2) are selected sequentially at the sector sample time. In the simplest case there are two read/write heads 35, 37 and one disk 33 (see FIG. 4) and the disk is servo written in a format as depicted in FIG. 5 and FIG. 6. The read/write heads read the two surfaces, surface 0 and surface 1 (see FIG. 4), with head 37 and head 35 (i.e., head 0 on surface 0 B and head 1 on surface 1). Since the sectors are staggered, the stagger ST in FIG. 5 (expressed in time units) is determined by the number of disk surfaces If there is one disk (i.e. two surfaces) then n=2 and the sample time=t, so the stagger time=t/n=t/2. If t=260 μsec as described above and n=2, then the stagger time=260 μsec/2=130 μsec. Stagger is expressed conveniently in time units because due to the circular nature of the tracks, the actual stagger distance ST (See FIG. 5) in μinches differs on each track with the radius of the disk. Also, the disk drive microprocessor conventionally operates in time units because the microprocessor includes a clock for generating timing signals.

If the seek mode is started at a sector sample on head 0 (see FIG. 4) and the seek length is 8 tracks, when the read/write head reaches the target track, the read/write head has to read data on head 0. First the system switches to select head 1 and starts the seek. With accelerated boost, the track address is decoded and converted to binary and stored in the microprocessor, and the system prepares to read the next sample, which will be on head 0. After reading the head 0 track address, then head 1 is selected and head 1 reads the track address. Then head 0 is selected By this time 520 μsec has elapsed and the track address that head 0 should read is exactly one track different from the starting track address. Then head 1 is selected, then head 0, then head 1; at this point in time 1040 μsec has elapsed, and the track address is 4 tracks from the starting address. At this point the system starts deceleration with decelerated boost, and keeps on switching heads and moving until the track address is 7 different from the starting address, i.e. 8−7 =1=1 track to go. At this point the time should be 1560 μsec, so the system stops switching heads and remains on head 0 and goes down the rest of the trajectory of the scheduled velocity curve with only head 0 reading. The reason for remaining on one head is to permit reading of the servo signals (i.e. the analog signals) so as to position the read/write head 0 on the track. Also it is important to avoid switching heads at this point to avoid any problems due to head offsets (i.e., the heads in the headstack not being perfectly aligned with each other).

This staggered seek technique in another embodiment of the invention is extended to disk drives with two disks and four read/write heads, and is usable with any number of read/write heads greater than two. Let t be the sample time and n be the number of disks and let m be the maximum number of read/write heads and m≦2n, then stagger time=t/m.

The present invention in yet another embodiment of the invention is extended to any disk drive or optical disk drive, as will be obvious to one skilled in the art. The invention can be implemented in a dedicated servo surface drive. It is also compatible with either a conventional burst or a conventional di-bit recording pattern or any other servo pattern. In yet another embodiment, the invention is extended to drives with more than one head per surface as discussed supra.

The above description of the invention is illustrative and not limiting. Further modifications and equivalents may be employed without departing from the true spirit and scope of the invention.

I claim:

1. A sampled position system for moving a member between a first position and a second position comprising:

controlled acceleration means for moving the member at a controlled acceleration rate; and position sampling means for providing a sampled position signal representing a position of the member;

means for providing timing signals;

means for generating actuator control signals; and an actuator for moving the member in proximity to a surface in response to the actuator control signals, the surface having a plurality of tracks, each track having a width;

wherein the position sampling means is responsive to the timing signals to provide the sampled position signal representing the position of the member during a sampling time defined by the timing signals; and wherein the controlled acceleration is at a critical acceleration value such that the member, from a standing start, moves the width of one track in a time equal to the duration of two sampled positions signals.

2. The system of claim 1, further comprising controlled deceleration means for moving the member.

3. The system of claim 1, wherein the member is a disk drive headstack.

4. The system of claim 1, wherein the controlled acceleration is adaptive.

5. The system of claim 1, wherein the controlled acceleration rate is precalculated.

6. The system of claim 1, wherein each track contains at least one track address representing the position of the member when the member is on the track, and the track addresses are in Gray code.

7. A sampled position system for moving a member between a first position and a second position comprising:

controlled acceleration means for moving the member at a controlled acceleration rate;

position sampling means for providing a sampled position signal representing a position of the member;

means for providing timing signals;

means for generating actuator control signals;

at least a first surface and a second surface, each surface having a plurality of tracks, each track having a width and containing at least one track address at a track address location; and an actuator for moving the member in proximity to the first and second surfaces in response to the actuator control signals; and at least a first position sampling means in proximity to the first surface and a second position sampling means in proximity to the second surface;

wherein the position sampling means is responsive to the timing signals to provide the sampled position signal representing the position of the member during a sampling time defined by the timing signals;

wherein the track address of a particular track represents the position of the member when the member is at the particular track; and wherein the track address location of at least one track on the first surface is staggered in relation to the track address location of the corresponding track on the second surface.

8. The system of claim 7, wherein the amount of stagger is equal to the duration of one sampled position signal divided by the number of position sampling means.

9. The system of claim 7, further comprising switching means for sequentially selecting each of the position sampling means.

10. The system of claim 7, wherein the switching means stops sequentially switching when the position sampling means is positioned less than a predetermined number of tracks away from a particular track.

11. The system of claim 1, further comprising at least two digital to analog conversion channels for providing the actuator control signals to the actuator, wherein:

the first channel carries actuator control signals to cause the actuator to move the position sampling means from a first track to a second track; and the second channel carries actuator control signals to cause the actuator to move the position sampling means so as to follow a particular track.

12. A disk drive servo system comprising:

at least two disk surfaces;

at least one read/write head for reading data from each surface;

a plurality of tracks on each disk surface, each track having a width and including at least one track address readable by the read/write head for that surface, the track address being at a particular location on each track;

controlled acceleration and deceleration means for moving the read/write heads from a first track to a second track; and read/write head switching means for sequentially selecting each of the read/write heads to read data from each of the disk surfaces;

wherein the track address location of at least one track on the first surface is staggered in relation to the track address location of the corresponding track on the second surface.

13. The servo system of claim 12 wherein:

each track is divided into a plurality of data sectors and the track address is included in each sector; and wherein the controlled acceleration and deceleration means moves the read/write heads at a critical acceleration rate.

14. The servo system of claim 13, wherein the critical acceleration rate is such that the read/write heads move from a standing start a distance equal to twice the width of one track in a time equal to the time needed for a read/write head to read the data in one sector.

15. The servo system of claim 13, wherein the amount of stagger is equal to the time needed for a read/write head to read the data in one data sector divided by the number of disk surfaces.

16. The servo system of claim 15, wherein the read/write head switching means is operative only when a particular read/write head is more than a predetermined number of tracks away from a target track.

17. The servo system of claim 12, further comprising:

means for generating actuator control signals;

an actuator for moving the read/write heads in response to the actuator control signals;

a first digital to analog conversion channel for carrying actuator control signals to cause the actuator to move the read/write heads from a first track to a second track; and second digital analog conversion signal for carrying actuator control signals to cause the actuator to move a read/write head to follow a particular track.

18. A disk drive servo system comprising:

at least two disk surfaces;

at least one read/write head for reading data from each surface;

a plurality of tracks on each disk surface, each track including at least one track address readable by the read/write head for that surface, the track address being at a particular location on each track; and means for sequentially selecting each of the read/write heads to read data from each of the disk surfaces;

wherein the particular location of the track address of at least one track on the first surface is staggered in relation to the particular location of the track address of a corresponding track on the second surface.

* * * * *